United States Patent
Malik

(10) Patent No.: US 10,922,298 B2
(45) Date of Patent: Feb. 16, 2021

(54) SYSTEM AND METHOD FOR INDEXING TIME-SERIES-BASED DATA

(71) Applicant: Walmart Apollo, LLC, Bentonville, AR (US)

(72) Inventor: Sandeep Malik, Fremont, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 180 days.

(21) Appl. No.: 16/262,679

(22) Filed: Jan. 30, 2019

(65) Prior Publication Data

US 2020/0242095 A1    Jul. 30, 2020

(51) Int. Cl.
*G06F 16/00* (2019.01)
*G06F 16/22* (2019.01)
*G06F 16/23* (2019.01)
*G06F 16/245* (2019.01)

(52) U.S. Cl.
CPC ........ *G06F 16/2255* (2019.01); *G06F 16/221* (2019.01); *G06F 16/2379* (2019.01); *G06F 16/245* (2019.01)

(58) Field of Classification Search
CPC .................................................. G06F 16/2255
See application file for complete search history.

(56) References Cited

U.S. PATENT DOCUMENTS

| | | |
|---|---|---|
| 2007/0050446 A1 | 3/2007 | Moore |
| 2007/0061335 A1 | 3/2007 | Ramer et al. |
| 2007/0081550 A1 | 4/2007 | Moore |
| 2007/0088807 A1 | 4/2007 | Moore |
| 2007/0094350 A1 | 4/2007 | Moore |
| 2007/0106649 A1 | 5/2007 | Moore |
| 2007/0106650 A1 | 5/2007 | Moore |
| 2008/0215546 A1 | 9/2008 | Baum et al. |
| 2009/0164453 A1 | 6/2009 | Rothman |
| 2011/0010352 A1 | 1/2011 | Jockisch et al. |
| 2012/0117079 A1 | 5/2012 | Baum et al. |
| 2013/0060783 A1 | 3/2013 | Baum et al. |
| 2013/0151534 A1 | 6/2013 | Luks et al. |
| 2015/0149480 A1 | 5/2015 | Swan et al. |
| 2015/0156213 A1* | 6/2015 | Baker ................ H04L 63/1416 726/23 |
| 2015/0339351 A1 | 11/2015 | Swan et al. |

(Continued)

*Primary Examiner* — Ajith Jacob
(74) *Attorney, Agent, or Firm* — Bryan Cave Leighton Paisner LLP

(57) ABSTRACT

A system can include one or more processors and non-transitory computer-readable media storing computing instructions configured to run on the one or more processors and perform a method for indexing time-series-based event records in one or more event databases for speedy retrieval of event records of interest. In an embodiment, the method can comprise: receiving, at the system from a computing device, an inquiry from a user, the inquiry comprising an event having a time period and a changed attribute; retrieving, by the system from a computer database, at least one result event indicator, based on the time period and the changed attribute, from a hash table stored in the computer database; and retrieving, by the system, a search result based on inquiry and the one or more matched event records associated with the at least one result event indicator. Other embodiments are disclosed.

20 Claims, 9 Drawing Sheets

(56) References Cited

U.S. PATENT DOCUMENTS

| | | |
|---|---|---|
| 2016/0019218 A1 | 1/2016 | Zhang et al. |
| 2016/0063070 A1 | 3/2016 | Benum |
| 2016/0070736 A1 | 3/2016 | Swan et al. |
| 2016/0140128 A1 | 5/2016 | Swan et al. |
| 2016/0140238 A1 | 5/2016 | Swan et al. |
| 2016/0154836 A1 | 6/2016 | Swan et al. |
| 2017/0046402 A1 | 2/2017 | Swan et al. |
| 2017/0046403 A1 | 2/2017 | Swan et al. |
| 2017/0139961 A1 | 5/2017 | Baum et al. |
| 2017/0139962 A1 | 5/2017 | Baum et al. |
| 2017/0139963 A1 | 5/2017 | Baum et al. |
| 2017/0139968 A1 | 5/2017 | Baum et al. |
| 2017/0337230 A1 | 11/2017 | Baum et al. |
| 2017/0337231 A1 | 11/2017 | Baum et al. |
| 2017/0344591 A1 | 11/2017 | Baum et al. |
| 2018/0024702 A1 | 1/2018 | Noel et al. |
| 2018/0157693 A1 | 6/2018 | Swan et al. |
| 2018/0173739 A1 | 6/2018 | Baum et al. |
| 2018/0225319 A1 | 8/2018 | Baum et al. |
| 2018/0246919 A1 | 8/2018 | Baum et al. |
| 2020/0167349 A1* | 5/2020 | Marquardt ............ G06T 11/206 |

* cited by examiner

SYSTEM AND METHOD FOR INDEXING TIME-SERIES-BASED DATA

TECHNICAL FIELD

This disclosure relates generally to indexing time-series-based event records and/or providing information of one or more event records retrieved based on a changed attribute name and a time period, or one or more data records associated with the one or more event records.

BACKGROUND

Many computer systems have one or more event databases configured to store transactional logs of data records in event records of the computer systems for users to audit the data records and/or the transactional logs when needed. However, in a system with multiple subsystems, each having its own event databases such as an online retail system that has subsystems for different departments, building a centralized audit system can be challenging because transactional logs can be voluminous and also because the event databases of different subsystems may not have a uniform format. Indeed, having a single indexing mechanism for all event records in different event databases can be inefficient when data records may have different attributes, when not all event records concern changes in every attribute of the data records, and/or when some attributes are updated more often than others. In addition, unlike inquiries for data records in their current states, inquiries for auditing event records are generally time based and concern changes in one or more attributes. Therefore, systems and methods for indexing time-series-based event records in multiple space efficient hash tables, instead of a single gigantic hash table, are desired to be more time efficient in providing information.

BRIEF DESCRIPTION OF THE DRAWINGS

To facilitate further description of the embodiments, the following drawings are provided in which.

Figure 1:
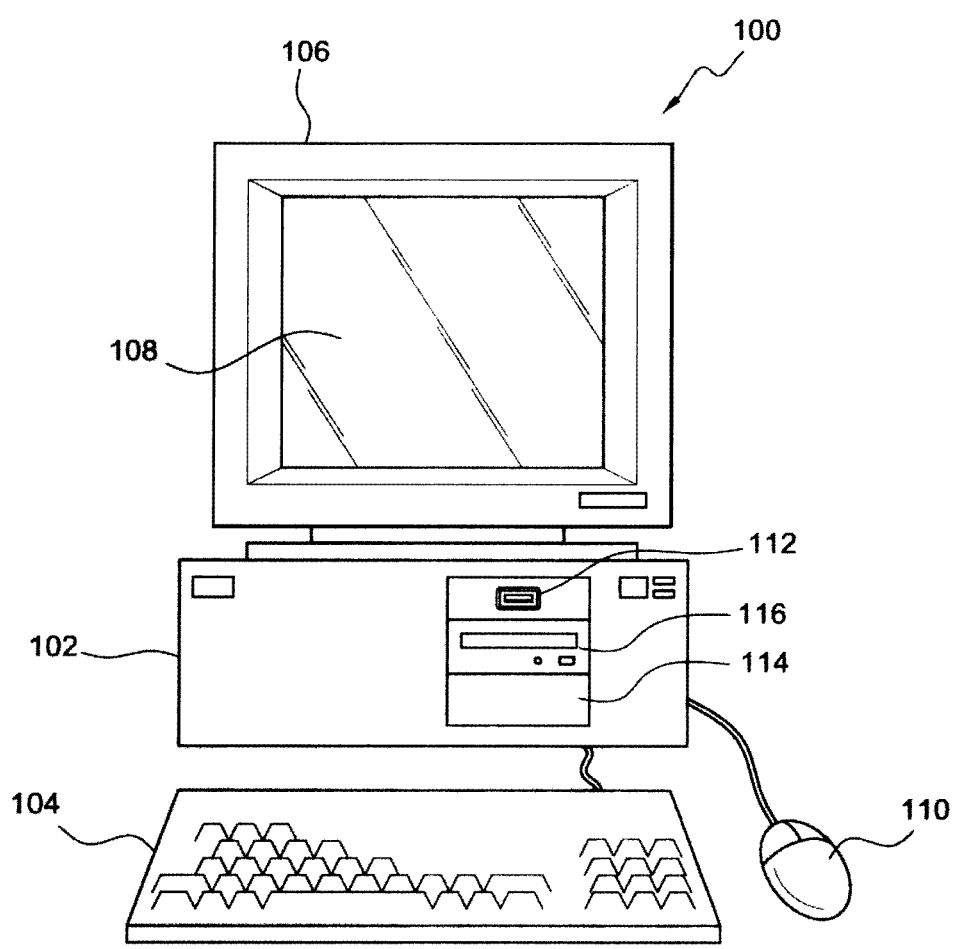
FIG. 1 illustrates a front elevational view of a computer system that is suitable for implementing an embodiment of the system disclosed in FIG. 3.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, five seconds, ten seconds, thirty seconds, one minute, five minutes, ten minutes, or fifteen minutes.

As defined herein, "attribute name," "field name," and "column name" of a database record can, in some embodiments, mean the name of a column in a database table of the database record, the column being associated with a field of the database record and the name of the column being stored in the metadata of a computer database. It is to be understood that the terms so used are interchangeable.

DESCRIPTION OF EXAMPLES OF
EMBODIMENTS

In an embodiment, a method can comprise: receiving, at a computer server from a computing device, an inquiry from a user, the inquiry comprising an event having a time period and a changed (or unchanged) attribute; retrieving, by the computer server from a computer database, at least one result event indicator, based on the time period and the changed attribute, from a hash table stored in the computer database; and retrieving, by the compute server, a search result based on inquiry and the one or more matched event records associated with the at least one result event indicator. In this embodiment, the hash table can comprise a hash function configured to locate the at least one result event indicator in the hash table based on the time period and a name of the changed attribute. The at least one result event indicator in this embodiment can comprises information about one or more matched event records in one or more event databases. The one or more event databases can be configured to store one or more event records including the one or more matched event records, and each of the one or more event records can comprise an updated column name and a timestamp.

In an embodiment where the method is performed by the computer server for auditing event records in databases with product information, an exemplary inquiry from the user can include an event such as "Product A's price updated last year," "any product description edited between October, 2015 and September, 2016," "any title changed within the last 3 months," or "Product B's inventory status in Q4 2005." The matched event records in this embodiment can include one or more transactional logs about the event requested in the inquiry, and the event records can be stored in one or more event databases, one of which can be the computer database storing the hash table. In this embodiment, the hash table can comprise one or more result event indicators associated with the name of the changed attribute of the requested event, such as "price," "product description," "title," or "inventory status," and the time period of the requested event, such as "last year," "between October, 2015 and September, 2016," "the past 3 months," or "Q4 2005."

In this embodiment, the one or more result event indicators of this embodiment can each comprise information about all or some of the matched event records, such as a count, the location(s), or the existence of such event records. The event records in this embodiment can each comprise an updated column name, such as "price," "product description," "title," or "inventory status," and a timestamp, such as 12:37 pm, Mar. 24, 2010. For example, when the requested event is "product description edited between October, 2015 and September, 2016," and when there are two event records, both including the updated column name, "product description," but only a first one having the timestamp, 9:00 am, Jan. 13, 2016, and only a second one including the timestamp, 2:31 pm, Jan. 13, 2016, the event indicator associated with product description and Jan. 1, 2016 can be a result event indicator and comprise the count of event records that are associated with this result event indicator, such as 2 here; the location of each of such event records in the one or more event databases, such as Database #1, Table #100, entry #199; or simply an indication of whether any event records associated with this result event indicator exist, such as YES or 1 here. In another example, when the requested event is "Product B's inventory status in Q4 2005," and when there are 40 event records, each including the updated column name, "inventory status," and the timestamp in the last 3 months of 2005, the event indicators associated with these event records can be result event indicators and comprise the locations of each of such event records in the one or more event databases.

In an embodiment where the result event indicators each include the number of matched event records, when the inquiry is "how many times was the product description edited between October, 2015 and September, 2016," the method can return the search result by adding the numbers of matched event records from the result event indicators. In such embodiment, when the inquiry is "who edited the product description between October, 2015 and September, 2016," and based on the result event indicators, the method can determine that the product description was changed on Nov. 13, 2015, Jan. 1, 2016, and Jun. 28, 2016, and return the search result by further searching for the user information in the matched event records that concern data records with a field name, "product description," and have a timestamp of Nov. 13, 2015, Jan. 1, 2016, and Jun. 28, 2016 in the event databases. In the example above, where the requested event is "Product B's inventory status in Q4 2005," and the result event indicators include the locations of the 40 event records in the one or more event databases, the method of this embodiment can return the search result by retrieving the latest event record of the 40 event records and by returning the new value of the updated column name in the latest event record.

In another embodiment, a system can comprise one or more processors; and one or more non-transitory computer-readable media storing computing instructions configured to run on the one more processors. The computing instructions can be configured to perform: receiving an inquiry from a user, the inquiry comprising an event having a time period and a changed attribute; retrieving at least one result event indicator, based on the time period and the changed attribute, from a hash table stored in a computer database; and retrieving a search result based on the one or more matched event records associated with the at least one result event indicator. Like the hash table in the embodiments discussed above, the hash table in this embodiment can comprise a hash function configured to locate the at least one result event indicator in the hash table based on the time period and a name of the changed attribute. In this embodiment, the at least one result event indicator can comprise information about one or more matched event records in one or more event databases, and the one or more event databases can store one or more event records including the one or more matched event records. The one or more event records in this embodiment can each comprise an updated column name and a timestamp.

An embodiment with a hash table comprising information about event records and organized based on the name of the changed attribute and the time period of the event records, as the embodiments above, can be advantageous for auditing data records in one or more databases because auditing generally involves inquiries about a certain type of event in a certain time period, such as whether a specific attribute in the data records is changed, rather than the value of the changed attribute. Structuring the hash table based on the names of the changed attributes and the time period, as in this embodiment, can make it more efficient to search for event records for auditing and other purposes.

Figure 2:
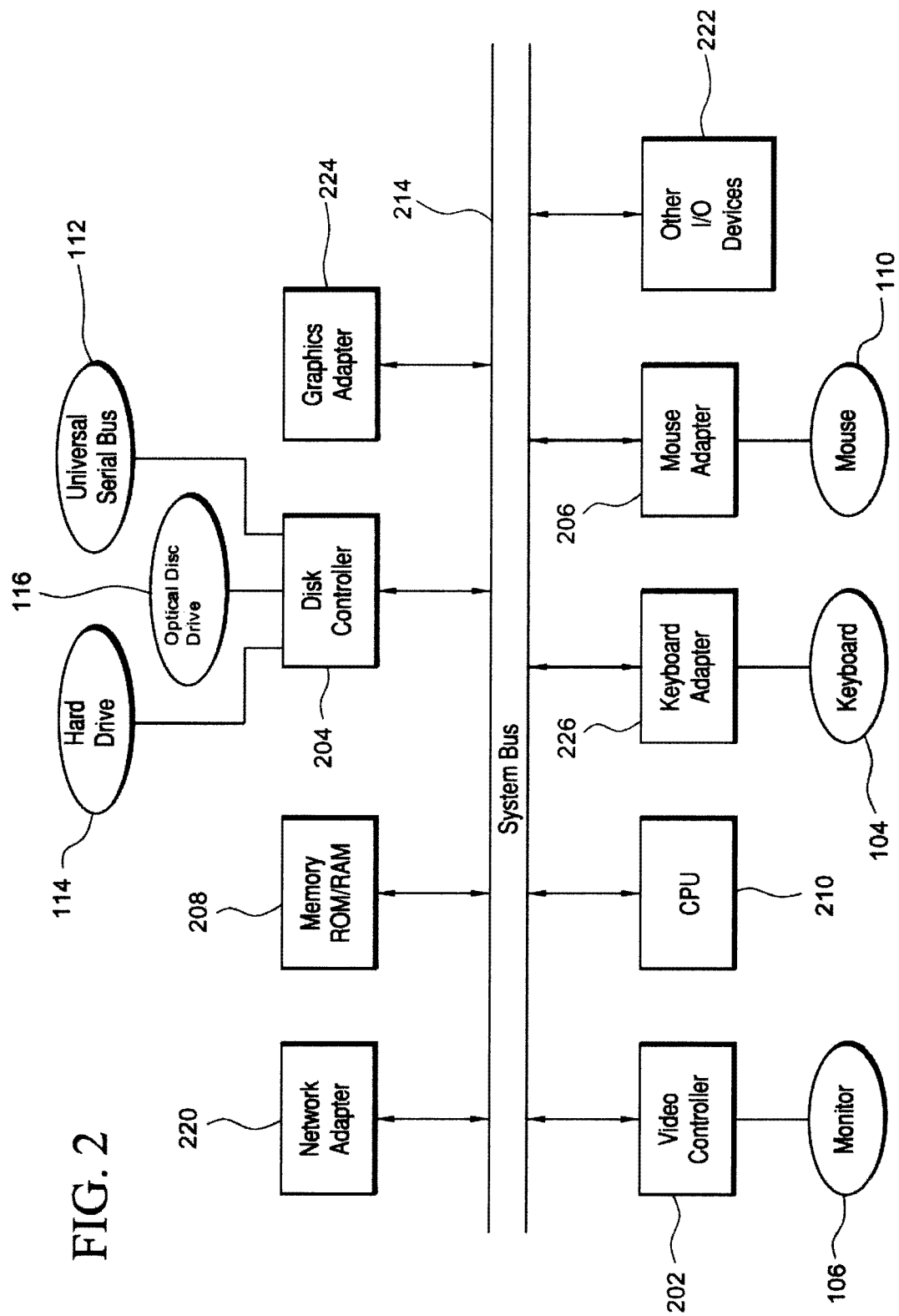
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of computer system 100 (and its internal components, or one or more elements of computer system 100) can be suitable for implementing part or all of the techniques described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to memory storage unit 208 that includes both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can include microcode such as a Basic Input-Output System (BIOS). In some examples, the one or more memory storage units of the various embodiments disclosed herein can include memory storage unit 208, a USB-equipped electronic device (e.g., an external memory storage unit (not shown) coupled to universal serial bus (USB) port 112 (FIGS. 1-2)), hard drive 114 (FIGS. 1-2), and/or CD-ROM, DVD, Blu-Ray, or other suitable media, such as media configured to be used in CD-ROM and/or DVD drive 116 (FIGS. 1-2). Non-volatile or non-transitory memory storage unit(s) refer to the portions of the memory storage units(s) that are non-volatile memory and not a transitory signal. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Exemplary operating systems can includes one or more of the following: (i) Microsoft® Windows® operating system (OS) by Microsoft Corp. of Redmond, Wash., United States of America, (ii) Mac® OS X by Apple Inc. of Cupertino, Calif., United States of America, (iii) UNIX® OS, and (iv) Linux® OS. Further exemplary operating systems can comprise one of the following: (i) the iOS® operating system by Apple Inc. of Cupertino, Calif., United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, Calif., United States of America, (v) the Windows Mobile™ operating system by Microsoft Corp. of Redmond, Wash., United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to a keyboard 104 (FIGS. 1-2) and a mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing a monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM and/or DVD drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 (FIG. 1) by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 (FIG. 100) and the circuit boards inside chassis 102 (FIG. 1) are not discussed herein.

When computer system 100 in FIG. 1 is running, program instructions stored on a USB drive in USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out all or at least part of the techniques described herein. In various embodiments, computer system 100 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 100, and can be executed by CPU 210. In the same or different embodiments, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile device, such Block as a smartphone. In certain additional embodiments, computer system 100 may comprise an embedded system.

Figure 3:
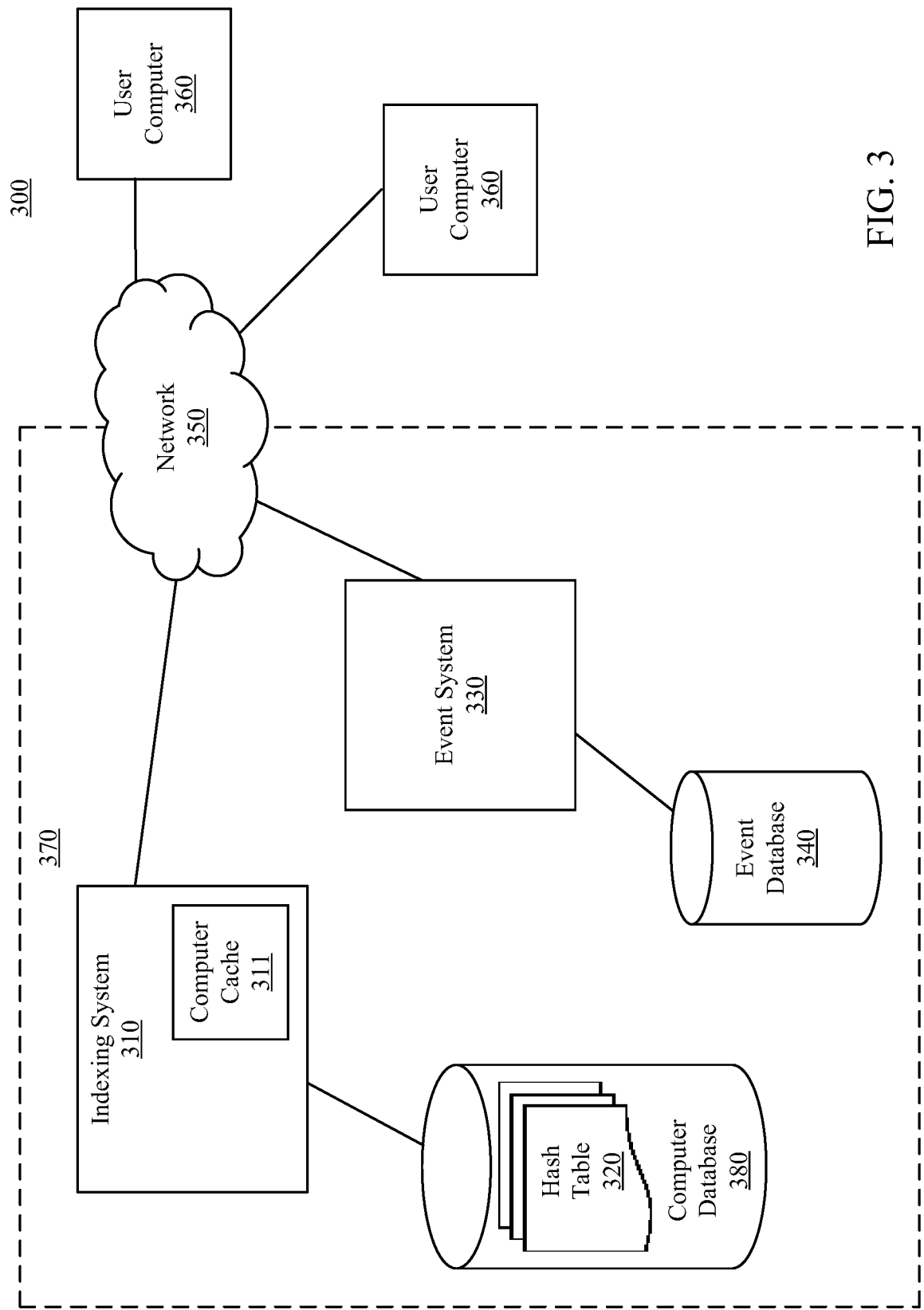
FIG. 3 illustrates a system for indexing time-series-based event records comprising varied attributes, according to an embodiment.

Turning ahead in the drawings, FIG. 3 illustrates system 300, according to an embodiment. In many embodiments, system 300 comprises an indexing system, such as indexing system 310, an event system, such as event system 330, a computer network, such as network 350, one or more user computers, such as user computers 360, and one or more databases, such as database 340 and/or 380. In many embodiments, indexing system 310 can be configured to index the one or more event records stored in a database, such as event database 340, and save the index in a hash table, such as hash table 320 stored in computer database 380.

System 300 is merely exemplary, and embodiments of system 300 are not limited to the embodiments presented herein. System 300 can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. Systems 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

As shown in the embodiment in FIG. 3, computer network 350 is coupled to indexing system 310, event system 330, and user computers 360; computer database 380 comprises a hash table 320 and is coupled to indexing system 310; and event database 340 is coupled to event system 330. In many embodiments, hash table 320 can comprise one or more partial indices to event records; the indices in hash table 320 can be grouped by the name of a changed attribute, and the grouped indices can be arranged in a time-based hierarchy in each group. In some embodiments, system 370 can comprise indexing system 310, event system 330, event database 340, and computer database 380 and be in data communication through computer network 350 with one or more user computers 360. In some embodiments, indexing system 310, event system 330, event database 340, and computer database 380 can communicate with each other through an internal network, in system 370, separate from a computer network coupling the user devices 360 to system 370. In some embodiments, system 370, indexing system 310, and/or event system 330 can be in data communication with user computers 360 through a website hosted by a web server that hosts one or more other websites. In some embodiments, system 370, indexing system 310, and/or event system 330 can be in data communication with a system, such as an online retail server configured to allow an administrator to maintain product listings, configured to generate an event record to be processed by system 370, indexing system 310, and/or event system 330.

In some embodiments, user computers 360 can be used by users, which also can be referred to as auditors. In these or other embodiments, an operator and/or administrator of system 300 can manage indexing system 310, event system 330, and/or user computers 360, the processor(s) of indexing system 310, event system 330, and/or user computers 360, and/or the memory storage unit(s) of indexing system 310, event system 330, and/or user computers 360 using the input device(s) and/or display device(s) of indexing system 310, event system 330, and/or user computers 360.

In many embodiments, indexing system 310 also can include event system 330, and/or one or more databases 340 and 380. Indexing system 310 and event system 330 can each be a computer system, such as computer system 100 (FIG. 1), as described above, and can each be a single computer, a single server, or a cluster or collection of computers or servers, or a cloud of computers or servers. In many embodiments, indexing system 310 and event system 330 can each include one or more computer caches, such as computer cache 311, and the one or more computer caches can each be a hardware or software component. In other embodiments, a single computer system can host indexing system 310, event system 330, and/or system 370.

In certain embodiments, user computers 360 can be implemented with desktop computers, laptop computers, a mobile device, and/or other endpoint devices used by one or more users, respectively. A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Exemplary mobile devices can include (i) an iPod®, iPhone®, iTouch®, iPad®, MacBook® or similar product by Apple Inc. of Cupertino, Calif., United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, Calif., United States of America, (ii) the Blackberry® operating system by Research In Motion (RIM) of Waterloo, Ontario, Canada, (iii) the Palm® operating system by Palm, Inc. of Sunnyvale, Calif., United States, (iv) the Android™ operating system developed by the Open Handset Alliance, (v) the Windows Mobile™ operating system by Microsoft Corp. of Redmond, Wash., United States of America, or (vi) the Symbian™ operating system by Nokia Corp. of Keilaniemi, Espoo, Finland.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can include a mobile device, and vice versa. However, a wearable user computer device does not necessarily include a mobile device, and vice versa.

In specific examples, a wearable user computer device can include a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can include (i) Google Glass™ product or a similar product by Google Inc. of Menlo Park, Calif., United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, N.Y., United States of America. In other specific examples, a head mountable wearable user computer device can include the Virtual Retinal Display™ product, or similar product by the University of Washington of Seattle, Wash., United States of America. Meanwhile, in further specific examples, a limb mountable wearable user computer device can include the iWatch™ product, or similar product by Apple Inc. of Cupertino, Calif., United States of America, the Galaxy Gear or similar product of Samsung Group of Samsung Town, Seoul, South Korea, the Moto 360 product or similar product of Motorola of Schaumburg, Ill., United States of America, and/or the Zip™ product, One™ product, Flex™ product, Charge™ product, Surge™ product, or similar product by Fitbit Inc. of San Francisco, Calif., United States of America.

In many embodiments, system 300, system 370, indexing system 310, and/or event system 340 can each include one or more input devices (e.g., one or more keyboards, one or more keypads, one or more pointing devices such as a computer mouse or computer mice, one or more touchscreen displays, a microphone, etc.), and/or can each include one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to system 300, system 310, machine learning module 320, and/or website 330 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of system 300, system 370, indexing system 310, and/or event system 340. In a similar manner, the processors and/or the non-transitory computer-readable media can be local and/or remote to each other.

Meanwhile, in many embodiments, system 300, system 370, indexing system 310, and/or event system 340 each also can be configured to communicate with and/or include one or more databases, such as databases 340, 380, and/or other suitable databases. The one or more databases can include an event database that contains information about event records, transactions, or logs from one or more systems, for example, among other data as described herein, such as described herein in further detail. The one or more databases can further include one or more hash tables, such as hash table 320, configured to provide indices for one or more event records in the one or more databases and/or other suitable databases. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, communication between system 300, system 370, indexing system 310, and/or event system 340, and/or the one or more databases 340 and/or 380 can be implemented using any suitable manner of wired and/or wireless communication. Accordingly, system 300, system 370, indexing system 310, and/or event system 340 can each include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

Figure 4:
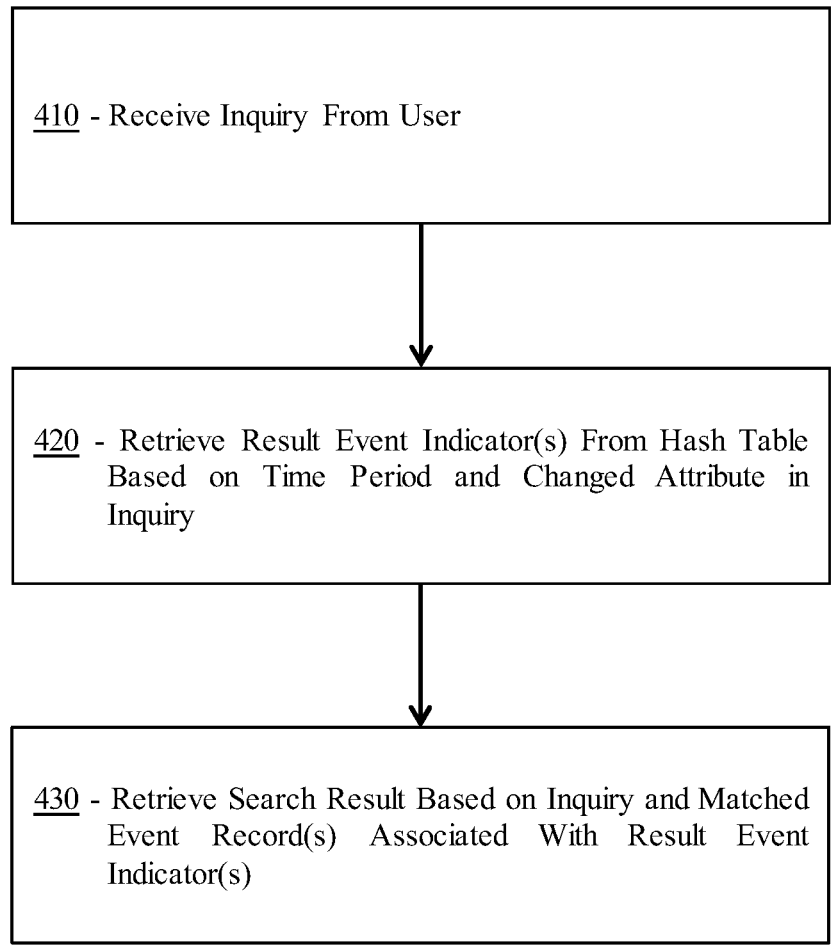
FIG. 4 illustrates a flow chart for a method for acquiring information about indexed event records based on a time period and the name of a changed attribute, according to another embodiment.

Turning ahead in the drawings, FIG. 4 illustrates a flow chart for a method 400, according to an embodiment. In many embodiments, method 400 can be a method for retrieving information about any event records concerning any changes to an attribute that occurred in a time period. Method 400 is merely exemplary and is not limited to the embodiments presented herein. Method 400 can be employed in many different embodiments or examples not specifically depicted or described herein. In some embodiments, the procedures, the processes, and/or the activities of method 400 can be performed in the order presented. In other embodiments, the procedures, the processes, and/or the activities of method 400 can be performed in any suitable order. In still other embodiments, one or more of the procedures, the processes, and/or the activities of method 400 can be combined or skipped.

In many embodiments, system 300, system 370, or indexing system 310 (FIG. 3) can be suitable to perform method 400 and/or one or more of the activities of method 400. In these or other embodiments, one or more of the activities of method 400 can be implemented as one or more computing instructions configured to run at one or more processors and configured to be stored at one or more non-transitory computer readable media. Such non-transitory computer readable media can be part of a computer system such as system 300, system 370, or indexing system 310 (FIG. 3). The processor(s) can be similar or identical to the processor(s) described above with respect to computer system 100 (FIG. 1).

In many embodiments, method 400 can be performed by a computer server to receive, from a computing device, an inquiry from a user (block 410); retrieve, from a computer database, at least one result event indicator(s) from a hash table stored in the computer database, based on the time period and the changed attribute in the inquiry (block 420); and retrieving a search result based on the inquiry and the one or more matched event records associated with the at least one result event indicator (block 430). The inquiry from the user in block 410 can include search criteria for one or more events, including the time period and the changed attribute of the events. An exemplary inquiry can be "how often was Product A's price changed during the past 3 years," and the search criteria in this inquiry can include a field name, "price," for Product A and a time period from the time the inquiry is received up to 36 months ago.

The hash table in many embodiments can be structured based on the name(s) of one or more attributes, whose changes caused events to be recorded in the event records, and the time period of such events. In some embodiments, the hash table also can be divided or partitioned based on the products. In some embodiments, the hash table can further comprise one or more time-based hierarchies in order to easily locate the at least one result event indicator by the time period. Further details of the hash table in various embodiments are to be discussed below. Furthermore, in many embodiments, method 400 can include providing a user interface with drop-down or other options for the user to formulate an inquiry with various combinations of predetermined search criteria. In some embodiments, method 400 can include natural language processing capabilities in block 410 to parse and analyze the inquiry.

In some embodiments, the result event indicator(s) in block 430 can comprise information associated with the matched event record(s), such as a count, a location, or whether there is any event records meeting the search criteria and associated with the result event indicator(s). After block 430, method 400 can transmit information regarding the search result to the user who transmitted the inquiry in block 410. The transmission can include facilitating a display of the information onto a graphical user interface on a screen of a device of the user. The device can be any of the devices described above with references to FIGS. 1, 2, and 3, such as a desktop computer, a mobile smartphone, and the like.

Figure 5:
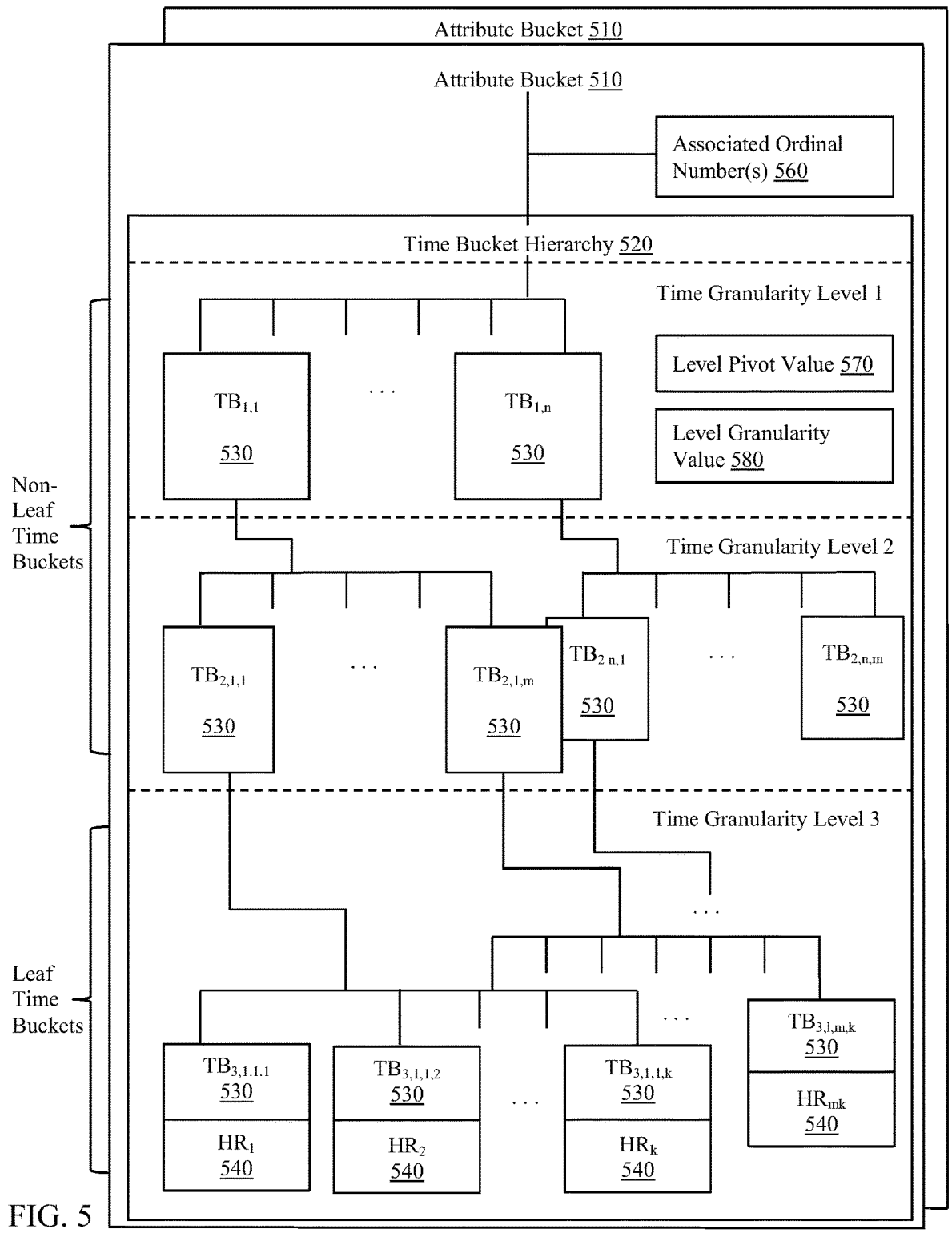
FIG. 5 illustrates a symbolic representation of a hash table comprising one or more attribute buckets, according to another embodiment.

Turning ahead in the drawings, FIG. 5 illustrates a symbolic representation of hash table 500, according to an embodiment. In many embodiments, hash table 500 is configured to store the partial indices of one or more event records based on the attribute name and the timestamp of the each of one or more event records. Hash table 500 is merely exemplary and is not limited to the embodiments presented herein. Hash table 500 can be employed in many different embodiments or examples not specifically depicted or described herein. In other embodiments, the structures, hierarchies, and/or elements can be performed by other suitable structures, hierarchies, and/or elements of hash table 500. In many embodiments, system 300 (FIG. 3), system 370 (FIG. 3), indexing system 310 (FIG. 3), and/or method 400 (FIG. 4) can be suitable to adopt hash table 500 and/or one or more of the structures and/or elements of hash table 500. For example, hash table 320 (FIG. 3) stored in computer database 380 (FIG. 3) can be similar to hash table 500.

In many embodiments, hash table 500 can comprise one or more attribute buckets, such as attribute buckets 510. In many embodiments, hash table 500 is configured to store only partial indices when the one or more attribute buckets, such as attribute buckets 510, correspond to some, but not all, attributes of the data records that are associated with one or more event records. In many embodiments, each of the attribute buckets of hash table 500 can be associated with a predetermined number of ordinal numbers, such as associated ordinal numbers 560, and the predetermined number is called a "predetermined attribute-bucket size." As an example, the predetermined number of ordinal numbers can be 5. In many embodiments, each of the attribute buckets of hash table 500 also can comprise a time bucket hierarchy, such as time bucket hierarchy 520, and the time bucket hierarchy can have one or more time granularity levels, such as Time Granularity Levels 1-3, and one or more time buckets, such as time buckets 530, in each time granularity level. In many embodiments, the one or more ordinal numbers can be uniquely associated to the name of a changed attribute, and the association between an ordinal number and an attribute name can be stored in a computer cache, such as computer cache 311 (FIG. 3), and/or a computer database, such as computer database 380 (FIG. 3).

As shown in FIG. 5, the one or more time buckets of many embodiments, such as time buckets 530, in the time bucket hierarchy, such as time bucket hierarchy 520, can each be associated with a single time granularity level. In many embodiments, the one or more time buckets, such as time buckets 530, in the time bucket hierarchy, such as time bucket hierarchy 520, can be categorized as either leaf time buckets, including the one or more time buckets at the bottom or finest time granularity level, such as Time Granularity Level 3, or non-leaf buckets, including the one or more time buckets at other time granularity level(s), such as Time Granularity Level 1, but not both. In many embodiments, each of the leaf time buckets can comprise a single hash record, such as hash record 540, and every single hash record, such as hash record 540, can be part of only a single leaf time bucket and comprise the predetermined attribute-bucket size of event indicators.

Furthermore, in many embodiments, each of the time buckets, such as time buckets 530, can comprise a timespan, such as {00:00:00 AM, 01/01/2018-11:59:59 PM, 12/31/2018} for a time bucket 530 at Time Granularity Level 1; {00:00:00 AM, 04/01/2018-11:59:59 PM, 04/30/2018} for a time bucket 530 at Granularity Level 2; or {00:00:00 AM, 07/21/2018-11:59:59 PM, 07/21/2018} for a time bucket 530 at Granularity Level 3. In some embodiments, at least one of the one or more time granularity levels in a time bucket hierarchy, such as Time Granularity Level 1 of time bucket hierarchy 520, can comprise a level pivot value, such as Level Pivot Value 570, and a time granularity value, such as Level Granularity Value 580. In such embodiments, the timespan of a time bucket, such as time bucket 530, at the at least one of the one or more time granularity levels, such as Time Granularity Level 1, can comprise an offset to the level pivot value of at least one of the one or more time granularity levels.

For instance, in the aforementioned embodiment whose hash table 500 only indexes event records in the past 10 years, the level pivot value of the top time granularity level, such as Level Pivot Value 570, can be Y-9, and the time granularity value of this time granularity level, such as Level Granularity Value 580, can be 1. Accordingly, the offsets of the timespans for time buckets 530 at Time Granularity Level 1 can be 0, 1, 2, . . . 9. In another embodiment whose time bucket hierarchy has 3 time buckets at a time granularity level, and the 3 time buckets at this time granularity level each comprise a timespan for 10-year durations, this time granularity level can comprise a level pivot value, such as 1970, and a level granularity value of 10. For such embodiments, the timespan comprising an offset can be calculated or restored to start at: level pivot value+offset*time granularity value, and end right before: level pivot value+(offset+1)*time granularity value. That is, in the previous embodiment where the time granularity level of the time granularity level is 1970, and the level granularity value is 10, if the offset is 3, the timespan can start at year 2000, i.e., 1970+3*10, and end right before year 2010, i.e., 1970+3*10. In other words, the offset can be determined by: (start time of timespan−level pivot value)/time granularity value. For instance, in the same example, if the timespan starts at year 2010, the offset is 4, i.e., (2010−1970)/10. In sum, the mathematical relationships between the timespan with a start time (TS) of a time bucket at a time granularity level with a level pivot value (PV) and a level granularity value (GV) and the offset (Offset) of the time bucket can be:

$TS = PV + \text{Offset} * GV$, and $\text{Offset} = (TS - PV)/GV$.

Using offsets for referring to a time bucket at a time granularity level in these and other embodiments can be beneficial in terms of reducing the storage size for a hash table. It can be space efficient when at least one attribute bucket in the hash table comprises a bulky time bucket hierarchy for various reasons, such as the attributes associated the attribute bucket change frequently and/or the retention period for the event records is very long. For example, if the aforementioned embodiment in FIG. 5 is configured to store the timespans of time buckets 530 at Time Granularity Level 1 without using offsets, each of the timespans of the 10 time buckets 530 concerning years would take at least 11 bits in a computer memory or other computer-readable media so that time bucket hierarchy 520 can be used for event records with timestamps up to the year 2047. But if the aforementioned embodiment in FIG. 5 is configured to store the timespans of time buckets 530 at Time Granularity Level 1 as offsets to a level pivot value of 1970 when the time granularity value of Time Granularity Level 1 is 1, the offset of each of the timespans of the 10 time buckets 530 at Time Granularity Level 1 can be reduced to 7 bits for time bucket hierarchy 520 to be used for event records of up to the year 2097. In many embodiments, every time granularity level of a time bucket hierarchy can comprise a level pivot value and a level granularity value, and the timespan of every time bucket can comprise an offset, while in other embodiments, such offsetting feature is used only at some, but not all, of the granularity levels of a time bucket hierarchy.

Furthermore, in other embodiments, in addition to a period of time, the timespan of each time bucket in a time bucket hierarchy, such as time bucket hierarchy 520, at a time granularity level, such as Time Granularity Level 1, can comprise a range of sequence numbers of the associated event records. In these and other embodiments, the timespan of a time bucket can include a period of time that is different in length from that of the timespan of another time bucket at the same time granularity level. For instance, in an embodiment as shown in FIG. 5, time bucket 530 ($TB_{2,1,1}$) can comprise a timespan {00:00:00 AM, 01/01/2009-11:59:59 PM, 02/14/2009} with a range of time of 000001-0001000 while time bucket 530 ($TB_{2,2,1}$) comprises a timespan {00:00:00 AM, 04/10/2010-11:59:59 PM, 05/15/2010} with a range of time of 0100001-0101000. Such embodiments can be advantageous for the purpose of balancing the time bucket hierarchy of the attribute bucket and improving search performance when the number of event records associated with every branch of the time bucket hierarchy can be even.

Figure 6:
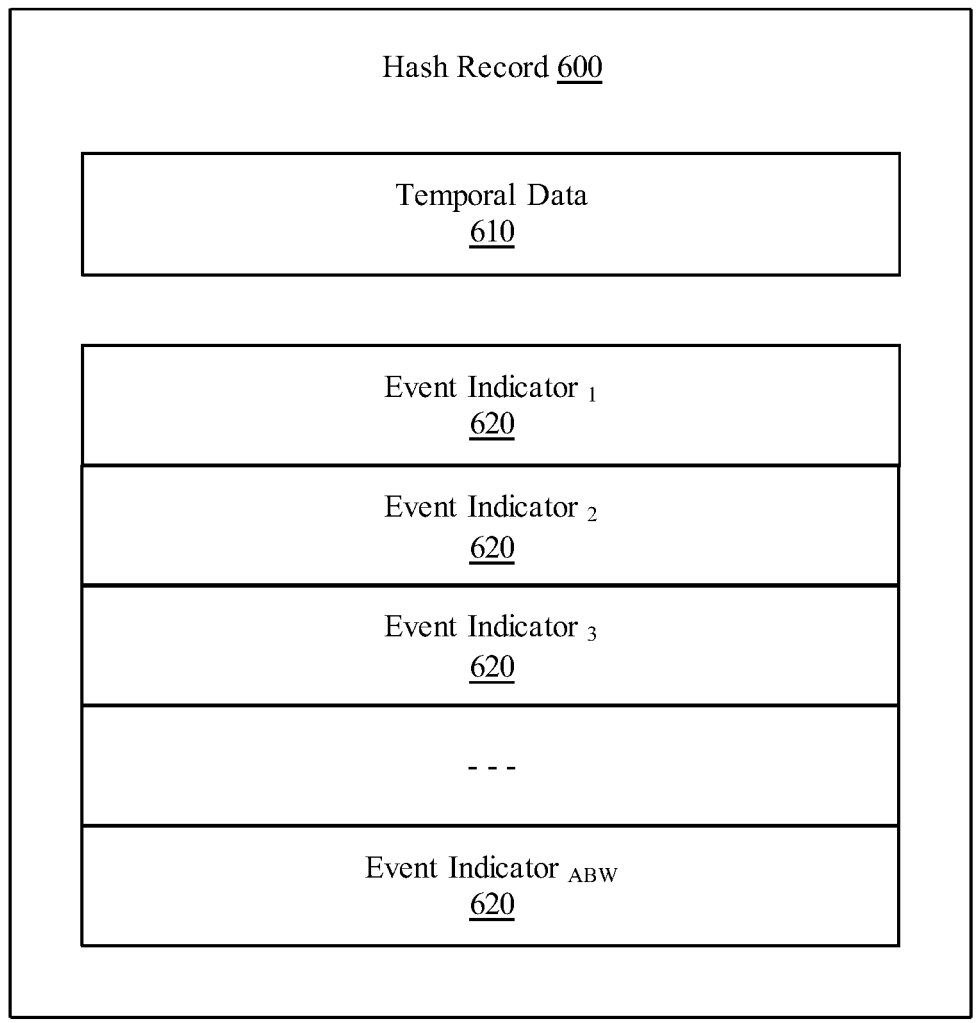
FIG. 6 illustrates a symbolic representation of a hash record, according to another embodiment.

In many embodiments, the time bucket hierarchy of an attribute bucket in a hash table can be stored in a hierarchical file system structure in which a directory is associated with a time granularity level of the one or more time granularity levels of the time bucket hierarchy, and the directory can include one or more files, each of the one or more files being associated with a time bucket of the one or more time buckets at the one of the one or more time granularity levels associated with the directory. In such embodiments, the each of the one or more files being associated with the time bucket of the one or more time buckets comprises a timespan and identifying information of the one of the one or more time buckets. In some embodiments, when the time bucket of the one or more time buckets is one of the leaf time buckets, the file associated with the time bucket of the one or more time buckets can further comprise a hash record, such as hash record 600 (FIG. 6). In other embodiments where the one or more hash records of the time bucket hierarchy are stored sequentially, the one or more hash records can be stored together as a single file in this hierarchical file system structure.

Turning ahead in the drawings, FIG. 6 illustrates a symbolic representation of hash record 600 of a time bucket hierarchy of an attribute bucket in a hash table, according to an embodiment. Hash record 600 is each merely exemplary and is not limited to the embodiments presented herein. Hash record 600 can be employed in many different embodiments or examples not specifically depicted or described herein. In other embodiments, the structures, hierarchies, and/or elements can be performed by other suitable structures, hierarchies, and/or elements of hash record 600. In many embodiments, system 300, system 370, indexing system 310 (FIG. 3), method 400 (FIG. 4), and/or hash table 500 (FIG. 5) can be suitable to adopt hash record 600 and/or one or more of the structures and/or elements of hash record 600. For example, hash record 540 (FIG. 5) can be similar to hash record 600.

In many embodiments, hash record 600 can comprise temporal data 610 and a predetermined number, ABW, of event indicators 620, where ABW stands for attribute-bucket width or size. In many embodiments, the temporal data of a hash record of a time bucket hierarchy of an attribute bucket in a hash table, such as temporal data 610 of hash record 600, can include a row vector of L elements or level pointers, L being the number of time granularity levels in the time bucket hierarchy of the attribute bucket, and each level pointer of the temporal data being the value of a timespan or an offset of the beginning of the timespan of each time bucket in the time bucket hierarchy that leads to the each of the one or more hash records, such as time buckets 530 ($TB_{1,1}$, $TB_{2,1,1}$, and $TB_{3,1,1,1}$) for hash record 540 ($HR_1$) in FIG. 5. For instance, the temporal data of a hash record, such as temporal data 610 of hash record 600, when used in an embodiment with a hash table shown in FIG. 5, can be (0, 1, 1), because the time bucket hierarchy, such as time bucket hierarchy 520 (FIG. 5), has only one time granularity level, such as Time Granularity Level 1 (FIG. 5), that comprises a level pivot value, such as Level Pivot Value 570, which is Y-9, and a level granularity value, such as Level Granularity Value 580, which is 1. In another embodiment where the 3 time granularity levels of a time bucket hierarchy, such as Time Bucket Hierarchy 520 (FIG. 5), of an attribute bucket, such as Attribute Bucket 510, each have a level pivot value and a level granularity value, the level pivot values are 1970, 1, and 1 respectively, and the level granularity values are 1, 1, and 1 respectively, the temporal data of the thirtieth hash record, such as temporal data 610 of hash record 600 or hash record 540 ($HR_{30}$) (FIG. 5), can be (40, 0, 29) which represents Jan. 30, 2010, and the temporal data of the $100^{th}$ hash record, such as temporal data 610 of hash record 600 or hash record 540 ($HR_{100}$) (FIG. 5), can be (40, 2, 6) which represents Mar. 7, 2010.

In many embodiments, an event indicator of a hash record, such as event indicators 620 of hash record 600 or hash record 540 (FIG. 5) in hash table 500 (FIG. 5), can comprise information about one or more matched event records regarding one or more changes in an attribute with an ordinal number among the associated ordinal numbers of the attribute bucket, such as associated ordinal numbers 560 (FIG. 5) of attribute bucket 510 (FIG. 5), during a time period that overlaps with a timespan associated with the hash record. In these and other embodiments, the timespan associated with the hash record begins at a first time represented by the temporal data of the hash record and ends before a second time represented by the temporal data of a next hash record immediately following the hash record in the time bucket hierarchy. For instance, in the embodiment in the previous example where the $100^{th}$ hash record comprises a temporal data (40, 2, 6), when attribute bucket 510 (FIG. 5) in the hash table 500 (FIG. 5) of the embodiment, as shown in FIG. 5, can be associated with the predetermined attribute-bucket size, i.e., ABW=5 here, of attribute names, such as A1, A2, A3, A4, and A5, the event indicators of this hash record, such as event indicators 620 of hash record 600 or hash record 540 ($HR_{100}$) (FIG. 5), can comprise information about one or more event records regarding one or more changes in an attribute named A3 on Mar. 7, 2010, if the one or more event records exist in an event database. Examples of the information about the matched event records can include a count of the one or more event records, a location of each of the one or more event records, and/or a flag of whether there is any event records regarding an attribute with an ordinal number among the associated ordinal numbers of the attribute bucket.

In some embodiments, a time bucket hierarchy of an attribute bucket in a hash table, such as time bucket hierarchy 520 (FIG. 5), can be fully balanced, i.e., having two or more branches of time buckets all descend to the same level, such as Time Granularity Level 3 (FIG. 5). Such a time bucket hierarchy can have leaf time buckets associated with dates that do not exist, such as time bucket 530 ($TB_{3,1,2,31}$) for February 31 of year Y-9. In such embodiments, these leaf time buckets associated with dates that do not exist are not used and thus wasted. Nonetheless, such waste in storage space can be compensated by the improved speed of processing. For example, as the number of leaf time buckets associated with a time bucket at the finest level of the non-leaf time buckets in such embodiments, such as Granularity Level 2, is uniform, when hash records, such as hash records 540, are stored sequentially in a computer memory, a computer or server in these embodiment can be configured to determine the location of an event indicator in the attribute bucket of a hash table by a hash function:

$$ABW*IB*\text{TemporalData}+IB*(\text{Ordinal}-(\text{Ordinal}/ABW)*ABW)$$

where ABW=the predetermined attribute-bucket size, and also being a number of event indicators in each hash record of the one or more hash records in this attribute bucket; IB=the size of each event indicator of the each hash record; TemporalData=a row vector representing the temporal data; and Ordinal=the ordinal number assigned to the attribute/field name associated with the event indicator.

In other embodiments, the time bucket hierarchy of an attribute bucket in a hash table can be unbalanced when the numbers of leaf time buckets for the branches of the time bucket hierarchy and/or the finest time granularity level of each branch are not all the same. For instance, when a time bucket hierarchy in an embodiment is configured to dynamically create a new hash record and the one or more time buckets that are necessary to include the hash record from the top time granularity level to the bottom time granularity level in the time bucket hierarchy, only when an associated event record is created, the number of total time buckets in this time bucket hierarchy can be minimized at the cost of increased complication of a hash function to locate a hash record and/or an event indicator. In other embodiments, the time bucket hierarchy can be between fully balanced and unbalanced by comprising a full set of time buckets at the top time granularity level(s) when the time bucket hierarchy is created and by being configured to dynamically create a new hash record and one or more time buckets associated with the new hash record at the lower time granularity level(s) when needed.

Furthermore, in many embodiments, a time bucket of the time bucket hierarchy can further comprise an active record indicator configured to indicate whether at least one active hash record of the one or more hash records exists in at least one leaf time buckets associated with the time bucket. The at least one active hash record in these embodiments are among the hash records of the time bucket hierarchy that comprise at least one event indicator that is associated with at least one event record in the one or more event databases. In an embodiment, all the time buckets of a time bucket hierarchy can comprise active record indicators. In another embodiment, only non-leaf time buckets comprise active record indicators while leaf time buckets do not have any active record indicators. With an active record indicator in some or all of the time buckets of a time bucket hierarchy in an embodiment, the hash function of the hash table can be more time efficient during a search because the branches under a time bucket of the time bucket hierarchy can be left out or unexplored when the active record indicator of the time bucket indicates that no event records are associated with any event indicators under this time bucket.

Figure 7:
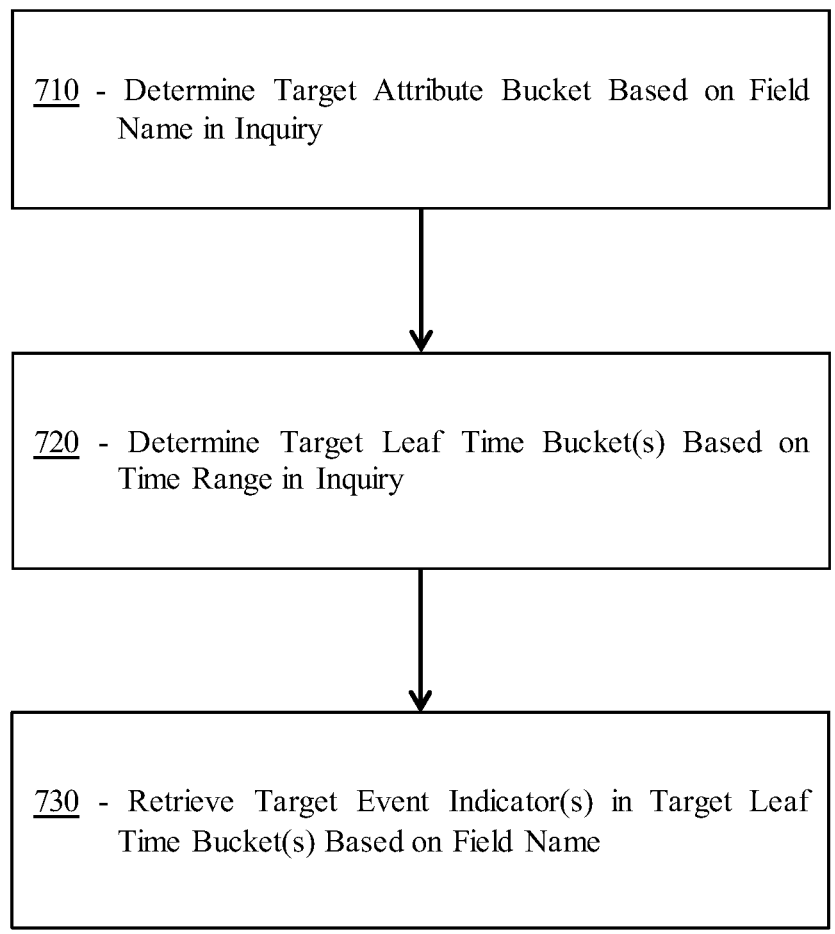
FIG. 7 illustrates a flow chart for a method for retrieving information, from a hash table, about one or more event records regarding one or more changes in an attribute in a period of time, according to another embodiment.

Turning ahead in the drawings, FIG. 7 illustrates a flow chart for a hash function 700 of a hash table for retrieving information in the hash table about one or more event records regarding one or more changes in an attribute in a period of time, according to another embodiment. In many embodiments, hash function 700 can comprise one or more steps of: determining a target attribute bucket of the target event indicator(s) based on a field name, or attribute name, of one or more requested event records in an inquiry (block 710); when the target attribute bucket associated with the field name exists in the hash table, determining a target leaf time bucket(s) in the time bucket hierarchy based on the time range of the one or more requested event records in the inquiry (block 720); and retrieving the target event indicator(s) of the single hash record of the target leaf time bucket(s) based on the field name (block 730).

Hash function 700, block 710, block 720, and block 730 are each merely exemplary and are not limited to the embodiments presented herein. Method 700 can be employed in many different embodiments or examples not specifically depicted or described herein. In some embodiments, the procedures, the processes, and/or the activities of method 700 can be performed in the order presented. In other embodiments, the procedures, the processes, and/or the activities of method 700 can be performed in any suitable order. In still other embodiments, one or more of the procedures, the processes, and/or the activities of method 700 can be combined or skipped. In many embodiments, system 300, system 370, indexing system 310 (FIG. 3), method 400 (FIG. 4), hash table 500 (FIG. 5), and/or hash record 600 (FIG. 6) can be suitable to use, or be used with, hash function 700 and/or one or more of the activities or blocks in hash function 700.

In many embodiments, a hash function, such as hash function 700, of a hash table, such as hash table 320 (FIG. 3) or hash table 500 (FIG. 5), can be configured to determine a target attribute bucket of the target event indicator(s) based on the attribute name or field name in an inquiry (block 710). In many embodiments, a hash table, such as hash table 320 (FIG. 3) or hash table 500 (FIG. 5), can comprise one or more attribute buckets, such as attribute buckets 510 (FIG. 5), and each of the one or more attribute buckets, such as attribute buckets 510 (FIG. 5), can comprise a predetermined attribute-bucket size of associated ordinal numbers, such as associated ordinal numbers 560 (FIG. 5), and a time bucket hierarchy, such as time bucket hierarchy 520 (FIG. 5).

In many embodiments, a hash table can be used with, or further comprise, an ordinal number table that comprises a one-on-one pairing of an attribute/field name, such as "price," "title," "manufacturer," or "material," and an ordinal number, such as 1, 2, 3, or 4. In some embodiments, the ordinal number table can be stored in a database, such as database 380 (FIG. 3) a hard drive, or a computer cache, such as computer cache 311 (FIG. 3), and accessed by a computer or system, such as system 300/370 or indexing system 310. In many embodiments, the hash function, such as hash function 700, can be configured to determine whether an attribute bucket in a hash table, such as attribute 510 (FIG. 5) of hash table 500 (FIG. 5) is a target attribute bucket (block 710) by retrieving a target ordinal number of the attribute name or field name from an ordinal number table and comparing the target ordinal number with the associated ordinal numbers of the attribute bucket, such as associated ordinal numbers 520 (FIG. 5) of attribute 510 (FIG. 5).

In many embodiments, when a target attribute bucket, such as attribute bucket 510 (FIG. 5) associated with the attribute name or field name exists in a hash table, such as hash table 500 (FIG. 5), a hash function, such as hash function 700, of the hash table, such as hash table 500 (FIG. 5), also can be configured to determine at least one target leaf time bucket in the time bucket hierarchy of the target attribute bucket (block 720), such as time bucket 530 (TB$_{3,1,1,1}$) in time bucket hierarchy 520 of attribute bucket 510 in FIG. 5, by exploring the time bucket hierarchy, such as time bucket 530 (TB$_{3,1,1,1}$) in time bucket hierarchy 520, until reaching the at least one target leaf time bucket that has a timespan overlapping the time range of the one or more requested event records in the inquiry.

In an embodiment where a time bucket of the time bucket hierarchy further comprises an active record indicator configured to indicate whether at least one active hash record of the one or more hash records exists in at least one leaf time buckets associated with the time bucket, the hash function of the time bucket hierarchy, such as hash function 700, also can be configured to skip, and not waste time exploring, the time bucket or a branch under the time bucket in the time bucket hierarchy, at a step of determining a target leaf time bucket(s), such as block 720, when the active record indicator of the time bucket shows that no active hash record(s) exists in the time bucket or the branch under the time bucket.

In many embodiments, when at least one target leaf time bucket that comprises a timespan overlapping the time range in the inquiry is found, a hash function, such as hash function 700, can be further configured to retrieve the target event indicator(s) in the target leaf time bucket(s) based on the field name (block 730) by determining the relative location of the target event indicator(s) among the event indicators of a hash record in the target leaf time bucket(s) based on the ordinal number of the field name and obtaining data in the target event indicator(s) located. For instance, when the ordinal number of the field name in the inquiry is 138, and the associated ordinal number of a target attribute bucket in an embodiment, such as associated ordinal numbers 560 of attribute bucket 510 in FIG. 5, are 136-140, the target event indicator(s) of a hash record(s) in any target leaf time bucket(s) in this target attribute bucket, such as event indicator 620 (FIG. 6) of hash record 600 (FIG. 6) or hash record 540 (FIG. 5) of time bucket 530 (FIG. 5) of attribute bucket 510 (FIG. 5), is always the 3$^{rd}$ event indicator of the one or more event indicators of the hash record(s) throughout the target attribute bucket.

Figure 8:
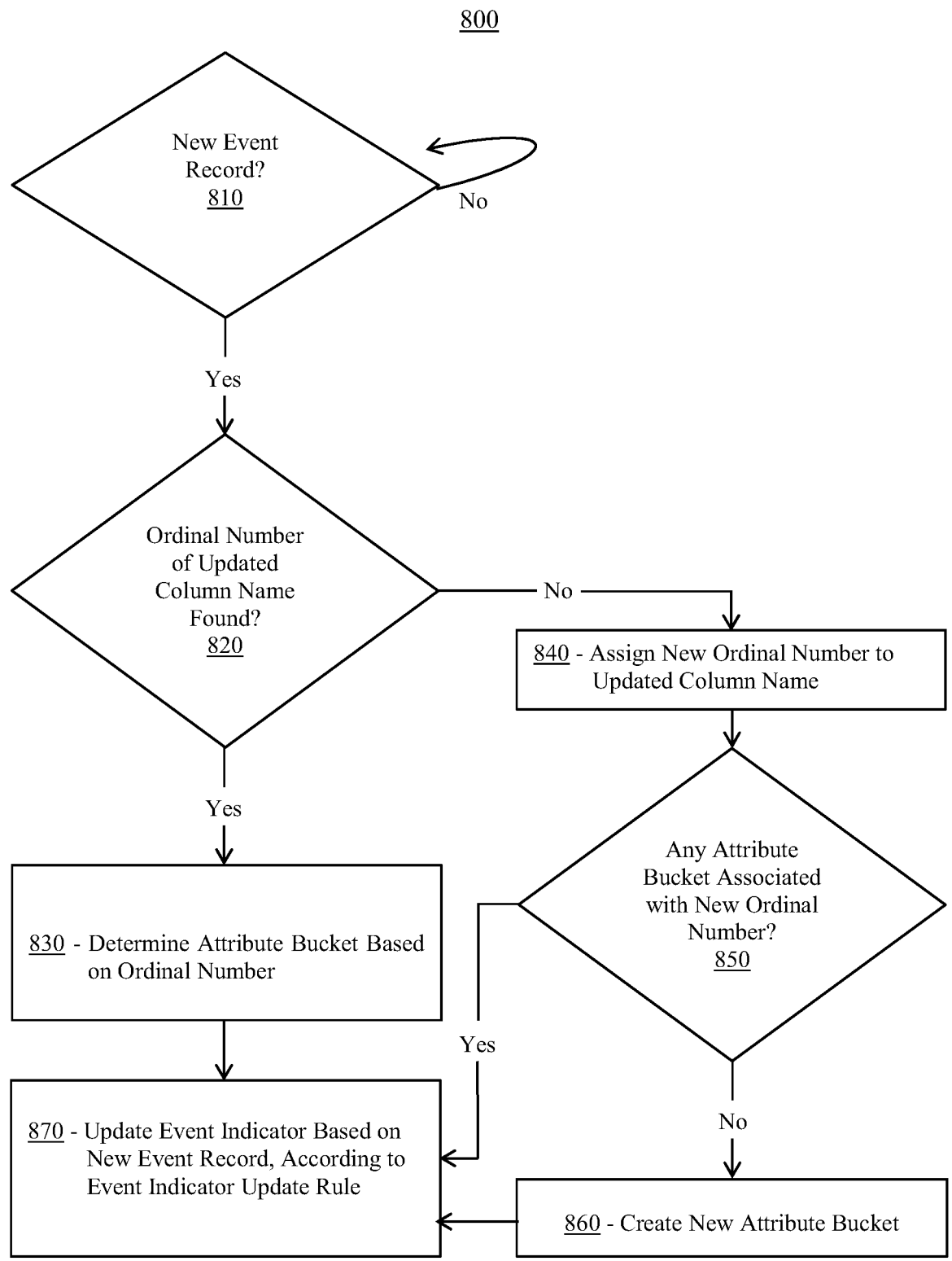
FIG. 8 illustrates a flow chart for a method for updating a hash table to index a new event record, according to another embodiment.

Turning ahead in the drawings, FIG. 8 illustrates a flow chart for a method 800 for updating a hash table to index a new event record, according to another embodiment. In many embodiments, method 800 can comprise: receiving a new event record for indexing in a hash table (block 810); looking up, in an ordinal number table stored in a computer cache, an ordinal number assigned to the updated column name of the new event record (block 820); if the ordinal number assigned to the updated column name is found, determining an attribute bucket from the one or more attribute buckets in the hash table, based on the ordinal number (block 830); if the ordinal number assigned to the updated column name of the new event record does not exist, assigning a new ordinal number to the updated column name in the ordinal number table (block 840), confirming whether the new ordinal number is among the associated ordinal numbers of any existing attribute bucket (block 850), and creating a new attribute bucket if no existing attribute bucket is associated with the new ordinal number (block 860); and if an existing attribute buck is associated with the new ordinal number (block 850), or after a new attribute bucket is created for the new ordinal number (block 860), or after determining the attribute bucket (block 830), then updating the event indicator based on the new event record according to an event indicator update rule (block 870).

Method 800 and blocks 810, 820, 830, 840, 850, 860, and 870 are each merely exemplary and are not limited to the embodiments presented herein. Method 800 can be employed in many different embodiments or examples not specifically depicted or described herein. In some embodiments, the procedures, the processes, and/or the activities of method 800 can be performed in the order presented. In other embodiments, the procedures, the processes, and/or the activities of method 800 can be performed in any suitable order. In still other embodiments, one or more of the procedures, the processes, and/or the activities of method 800 can be combined or skipped. In many embodiments, system 300, system 370, indexing system 310 (FIG. 3), method 400 (FIG. 4), hash table 500 (FIG. 5), hash record 600 (FIG. 6), and/or hash function 700 (FIG. 7) can be suitable to use, or be used with, method 800 and/or one or more of the activities or blocks in method 800.

In many embodiments, method 800 can be configured to receive a new event record from a system, such as system 370 (FIG. 3) or event system 300 (FIG. 3), or a computer database, such as event database 340 (FIG. 3), for indexing in a hash table, such as hash table 320 (FIG. 5) or hash table 500 (FIG. 5) (block 810). In some embodiments, method 800 can analyze the new event record, identify a change in the new event, and determine the column/attribute name of the change, i.e., the updated column name of the new event.

In many embodiments, method 800 can determine an ordinal number of the updated column name (block 820) by searching for the ordinal number in an ordinal number table based on the updated column name of the new event record, the ordinal number table comprising one or more one-on-one pairings of ordinal numbers and column/attribute names. In many embodiments, when the ordinal number is known, method 800 also can determine an attribute bucket, from the one or more attribute buckets in the hash table, such as hash table 320 (FIG. 3) or hash table 500 (FIG. 5), based on the ordinal number (block 830) by matching the ordinal number with the associated ordinal numbers of the attribute bucket, such as associated ordinal numbers 560 (FIG. 5) of attribute bucket 510 (FIG. 5).

In many embodiments, when no ordinal number is assigned to the updated column name of the new event, method 800 can assign a new ordinal number to the updated column name (block 840). In some embodiments where an ordinal number table, similar to the aforementioned ordinal number tables, is used to store one or more one-on-one pairings of ordinal numbers and column/attribute names and comprises a maximum ordinal number, method 800 also can add the pairing of the new ordinal number and the updated column name to the ordinal number table and increase the maximum ordinal number by one after assigning the maximum ordinal number to the new ordinal number. In many embodiments, the maximum ordinal number of the ordinal number table can have a value of either zero, when the ordinal number table is empty, or the smallest positive integer not yet assigned to any column/attribute name in the ordinal number table, such as 199 when the ordinal numbers 1-198 are paired with 198 different column/attribute names in the ordinal number table.

In many embodiments, an attribute bucket of a hash table can comprise a plurality of associated ordinal numbers. As such, in many embodiments, some attribute buckets, generally new attribute buckets, can be associated with one or more ordinal numbers that are not yet assigned to any column names. In many embodiments, method 800 can determine whether any existing attribute bucket in the hash table is associated with the new ordinal number (block 850) by matching the new ordinal number with each of the associated ordinal numbers of one of the one or more attribute buckets in the hash table, such as attribute buckets 510 (FIG. 5). In some embodiments where the one or more attribute buckets of a hash table are filled in sequentially without any adjustment in the structure of any of the one or more attribute buckets, to be discussed below, method 800 can check only the last attribute bucket of the one or more attribute buckets to see if the new ordinal number is among the associated ordinal numbers of the last attribute bucket.

In many embodiments, when no attribute bucket in the hash table comprises a matching associated ordinal number, method 800 can be configured to create a new attribute bucket (block 860). In many embodiments, a hash table can further comprise, or be associated with, one or more templates for a new attribute bucket or one or more rules to create a new attribute bucket. In an embodiment, method 800 can have a single default attribute bucket with a default number of associated ordinal numbers and a default time bucket hierarchy, similar to hash table 510 (FIG. 3), for every new attribute bucket. In another embodiment, method 800 can select from a plurality of templates of new attribute buckets to create a new attribute bucket for the new ordinal number, based on a choice of a system administrator or a table with one or more attribute names associated with each of the templates, the table comprising a list of all of one or more attribute names that can possibly exist even before the one or more attribute names are associated with any event records.

For example, in an embodiment with multiple templates for new attribute buckets, a first template of the multiple templates can be associated with attribute names, "price," "discount," "promotion code," and "inventory status," and comprise 10 associated ordinal numbers, i.e., the predetermined attribute-bucket size here being 10, and a time bucket hierarchy with 7 time granularity levels, and a second template of the multiple templates can be associated with attribute names, "SKU," "manufacturer," "country of origin," and "specification," and comprise 100 associated ordinal numbers, i.e., the predetermined attribute-bucket size here being 100, and a time bucket hierarchy with 3 time granularity levels.

In another embodiment, method 800 can use the one or more rules generated based on information from a machine learning system to create the new attribute bucket and/or determine which of the plurality of templates to use for the new attribute bucket. Additionally, in many embodiments, when the new attribute bucket is created with a predetermined attribute-bucket size of associated ordinal numbers, method 800 can assign the predetermined attribute-bucket size of consecutive, ascending numbers to the plurality of associated ordinal numbers of the new attribute bucket, starting from the new ordinal number.

In many embodiments, method 800 can update the event indicator of the attribute bucket associated with the new event record according to an event indicator update rule (block 870). In many embodiments, method 800 can locate the event indicator associated with the new event record in the hash table by a hash function of the hash table, such as hash function 700 (FIG. 7). In many embodiments, the event indicator update rule can comprise one of: if a value of the event indicator is zero, setting the event indicator to one; increasing the event indicator by one; or saving to the event indicator a pointer to the new event record in the one or more event database.

As shown in embodiments in FIGS. 3-9 and elaborated herein, an embodiment with a hash table organized based on attribute names (attribute buckets) and time period (time buckets) for auditing can be advantageous because it can reduce storage space needed for the hash table when the attributes that never change are not included in the hash table and also because the size of each attribute bucket can vary based on the frequency of change in the attributes to save space and improve efficiency for the hash function to locate the information about the event records of interest. Event records are voluminous and stored in chronological order without regard to what was changed in the data records. Different data records can have different attributes, while some attributes are common in data records of different types, such as title, country of origin, price, or product description being common to products records of different categories. Even for the same type of data records, some attributes change more frequently than others. In many embodiments, an attribute bucket associated to one or more attributes that do not change as frequent as others can have a time table hierarchy with fewer time granularity levels and/or fewer time buckets and thus save space for storing such time table hierarchy. For attributes that change frequently, the time buckets associated with such attributes in these or other embodiment can adopt time table hierarchies with more time granularity levels and/or more time buckets in each time granularity level and be easier to pinpoint the event indicators associated with event records that match the search inquiry.

Figure 9:
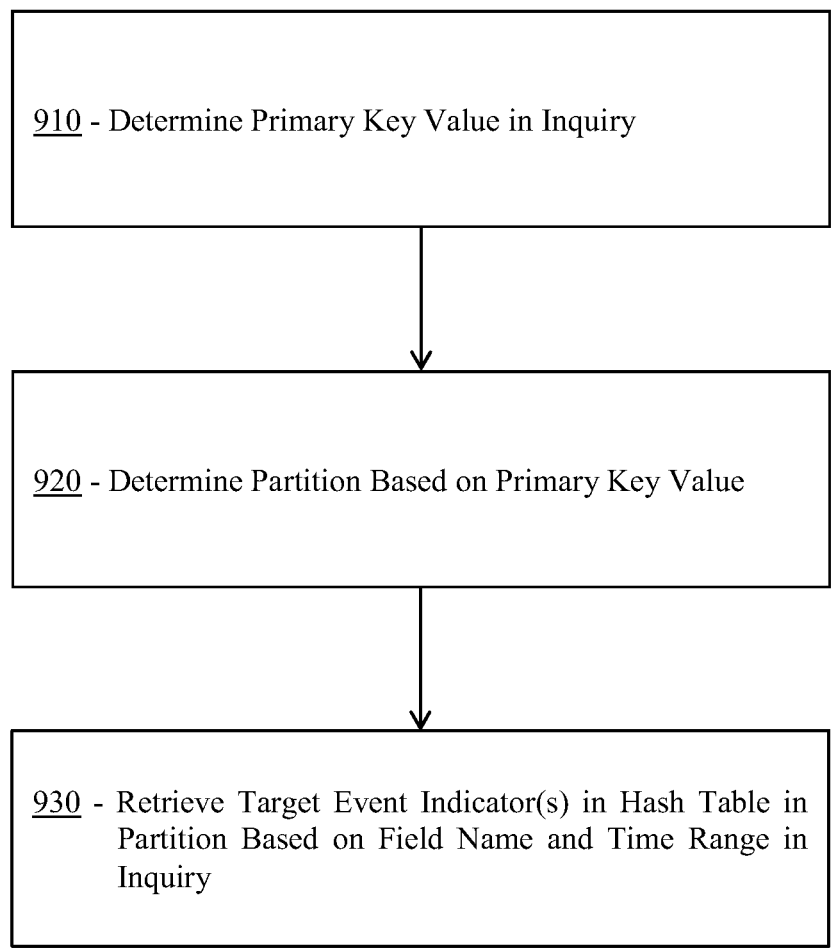
FIG. 9 illustrates a flow chart for a method for retrieving information, from one of the multiple hash tables each stored in a partition, about one or more event records regarding a primary key value and one or more changes in an attribute in a period of time, according to another embodiment.

Turning ahead in the drawings, FIG. 9 illustrates a flow chart for method 900 configured to retrieve information in a hash table about one or more event records regarding a primary key value and one or more changes in an attribute in a period of time, according to another embodiment. In many embodiments, method 900 comprises: determining a primary key value for one or more requested event in an inquiry (block 910); determining a partition comprising a hash table and associated with the primary key value (block 920); and retrieving at least one target event indicator(s) in the hash table in the partition based an attribute/field name and a time range of the one or more requested events (block 930).

Method 900 and blocks 910, 920, and 930 are each merely exemplary and are not limited to the embodiments presented herein. Method 900 can be employed in many different embodiments or examples not specifically depicted or described herein. In some embodiments, the procedures, the processes, and/or the activities of method 900 can be performed in the order presented. In other embodiments, the procedures, the processes, and/or the activities of method 900 can be performed in any suitable order. In still other embodiments, one or more of the procedures, the processes, and/or the activities of method 900 can be combined or skipped. In many embodiments, system 300, system 370, indexing system 310 (FIG. 3), method 400 (FIG. 4), hash table 500 (FIG. 5), hash record 600 (FIG. 6), hash function 700 (FIG. 7), and/or method 800 (FIG. 8) can be suitable to use, or be used with, method 900 and/or one or more of the activities or blocks in method 900.

In an embodiment with voluminous event records, if a single hash table comprises all the attribute buckets, the hash table may become enormous and take up too much space when loaded in a computer memory. In addition, in many embodiments, the attributes that may change in various data records as well as frequencies of changes may be different from one category of the data records to another. As such, in many embodiments, method 900 can divide one or more attribute buckets between/among multiple hash tables based on the primary key values, each associated with a single hash table of the multiple hash tables. In some embodiments, at least some of the multiple hash tables can be stored in different partitions. In some embodiments, a partition is configured to store only one hash table, while in other embodiments, a partition can be configured to store one or more hash tables. In many embodiments, a primary key value used as a basis for dividing attribute buckets into different hash tables can be a product category, such as "apparel," "electronics," or "toys." In many embodiments where a system comprise multiple hash tables, each including one or more attribute buckets and stored in different partitions, the partitions can each further comprise a subsystem, and when a plurality of inquiries for auditing comprise different primary key values, method 900 can be performed by parallel computing carried out by the subsystems and thus can improve the overall performance of the embodiments.

In many embodiments, method 900 can analyze an inquiry and determine a primary key value for a requested event in the inquiry (block 910). In many embodiments where attribute buckets are divided among multiple hash tables based on primary key values, each associated with a single hash table, and each of the multiple hash tables are stored in different partitions, method 900 can determine a partition, and the hash table stored in the partition, based on the primary key value in the inquiry (block 920) by matching the primary key value in the inquiry and the primary key value associated with the hash table. In many embodiments, when the hash table associated with the primary key value in the inquiry is known, method 900 can retrieve at least one target event indicator(s) in the hash table in the partition based an attribute/field name and a time range of the one or more requested events in the inquiry (block 930) by the hash function of the hash table, such as hash function 700 (FIG. 7).

Furthermore, in many embodiments, in the process of indexing new event records, a system and/or method can be further configured to dynamically adjust the time bucket hierarchy of a time bucket to balance the number of event records associated with each branch of the time bucket hierarchy by splitting a time bucket into 2 or more time buckets with smaller timespans. In many embodiments, when an inquiry for auditing comprises changes in more than one attributes in a period of time, the system and/or method also can divide the inquiry into more than one sub-inquiries, each comprising changes in one of the more than one attributes in the period of time, perform the method(s) discussed above, such as method 400 (FIG. 4), for each of the sub-inquiries, and return the combined results based on the Boolean operators in the inquiry.

Although systems and methods for managing a hash table for indexing one or more event records and searching among the one or more event records based on the name of the attribute or field changed and a time period in an inquiry for auditing have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-9 may be modified, and that the foregoing discussion of certain of these embodiments does not necessarily represent a complete description of all possible embodiments. For example, one or more of the procedures, processes, or activities in the blocks of FIGS. 4, 7, 8, and/or 9 may include different procedures, processes, activities, and/or blocks and may be performed by many different components in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
   receiving, at a computer server from a computing device, an inquiry from a user, the inquiry comprising an event having a time period and a changed attribute;
   retrieving, by the computer server from a computer database, at least one result event indicator, based on the time period and the changed attribute, from a hash table stored in the computer database, wherein:
      the hash table comprises a hash function, the hash function being configured to locate the at least one result event indicator in the hash table based on the time period and a name of the changed attribute;
      the at least one result event indicator comprises information about one or more matched event records in one or more event databases;
      the one or more event databases store one or more event records including the one or more matched event records; and
      each of the one or more event records comprises an updated column name and a timestamp; and
   retrieving, by the computer server, a search result based on the inquiry and the one or more matched event records associated with the at least one result event indicator.

2. The method of claim 1, wherein:
   the hash table comprises one or more attribute buckets, each of the one or more attribute buckets comprising a predetermined attribute-bucket size and a time bucket hierarchy; the hash table is updated when a new event record is added to the one or more event records, by:
      determining an attribute bucket, of the one or more attribute buckets and associated with the updated column name of the new event record, by looking up, in a computer cache, an ordinal number assigned to the updated column name of the new event record;
      when the ordinal number assigned to the updated column name of the new event record does not exist:
         assigning a new ordinal number to the updated column name of the new event record based on a maximum ordinal number saved in the computer cache and increasing the maximum ordinal number in the computer cache by one;
         when a last attribute bucket of the one or more attribute buckets is associated with the new ordinal number, determining an event indicator in the last attribute bucket based on the hash function of the updated column name and the timestamp of the new event record; and when none of the one or more attribute buckets is associated with the new ordinal number, creating a new attribute bucket in the one or more attribute buckets, wherein:

the new attribute bucket is associated with a number of consecutive, ascending attribute ordinal numbers starting from the new ordinal number, the number being the predetermined attribute-bucket size of the new attribute bucket; and the time bucket hierarchy of the new attribute bucket comprises one or more new time buckets, one of the one or more new time buckets comprising the event indicator determined based on the hash function of the updated column name and the timestamp of the new event record; and updating the event indicator based on the new event record according to an event indicator update rule.

3. The method of claim 2, wherein:

the event indicator update rule, for updating an associated event indicator based on an associated event record, comprises one of:

if a value of the associated event indicator is zero, setting the associated event indicator to one;

increasing the associated event indicator by one; or saving to the associated event indicator a pointer to the associated event record in the one or more event databases.

4. The method of claim 2, wherein:

the time bucket hierarchy of each attribute bucket of the one or more attribute buckets in the hash table further comprises one or more time granularity levels and one or more time buckets, each of the one or more time buckets comprising a timespan and being associated with a single time granularity level of the one or more time granularity levels, and the one or more time buckets comprising the one or more new time buckets;

the each attribute bucket of the one or more attribute buckets comprises one or more hash records, each hash record of the one or more hash records including a predetermined number of event identifiers, the predetermined number being the predetermined attribute-bucket size of the each attribute bucket; and one or more leaf time buckets of the one or more time buckets each further comprise a single bucket hash record of the one or more hash records while the each hash record of the each attribute bucket is part of only a single leaf time bucket of the one or more leaf time buckets.

5. The method of claim 1, wherein:

the hash function is configured to locate a target event indicator in the hash table based on a field name and a time range, by:

determining a target attribute bucket of the target event indicator based on the field name, the target attribute bucket comprising a time bucket hierarchy and one or more hash records, each hash record of the one or more hash records including a predetermined attribute-bucket size of event indicators;

when the target attribute bucket associated with the field name exists in the hash table, determining at least one target leaf time bucket in the time bucket hierarchy based on the time range, wherein:

the time bucket hierarchy comprises one or more time buckets and one or more time granularity levels;

each time bucket of the one or more time buckets comprises a timespan and is associated with a single time granularity level of the one or more time granularity levels;

one or more leaf time buckets of the one or more time buckets are at a finest time granularity level of the one or more time granularity levels, and each of the one or more leaf time buckets comprises a single hash record selected from the one or more hash records in the target attribute bucket, and the one or more leaf time buckets comprise the at least one target leaf time bucket, wherein the one or more leaf time buckets comprise the at least one target leaf time bucket; and the timespan of the at least one target leaf time bucket overlaps with the time range; and retrieving the target event indicator of the single hash record of the at least one target leaf time bucket based on the field name.

6. The method of claim 5, wherein:

the hash function is further configured to determine whether the target attribute bucket associated with the field name exists in the hash table by determining whether an ordinal number assigned to the field name associated with the target attribute bucket exists in a computer cache.

7. The method of claim 5, wherein:

the each time bucket of the one or more time buckets further comprises an active record indicator configured to indicate whether at least one active hash record of the one or more hash records in the target attribute bucket exists in at least one leaf time bucket associated with the each time bucket; and the at least one active hash record comprises at least one event indicator that is associated with at least one event record of the one or more event records.

8. The method of claim 5, wherein:

along each time granularity level of the one or more time granularity levels of the time bucket hierarchy, a single time bucket, of the one or more time buckets and associated with the each time granularity level, is associated with the each hash record of the one or more hash records;

the each hash record of the one or more hash records further comprises temporal data, the temporal data comprising a level pointer to the single time bucket associated with the each time granularity level of the one or more time granularity levels and the each hash record;

each event indicator of the predetermined attribute-bucket size of event indicators of the each hash record of the one or more hash records is configured to indicate whether at least one of the one or more event records falls within a leaf time bucket of the one or more leaf time buckets, the leaf time bucket comprising the each hash record comprising the each event indicator;

the one or more hash records of the target attribute bucket are stored in an ascending sequence based on the temporal data of the each hash record of the one or more hash records; and a relative location of the each event indicator among the one or more hash records stored in the ascending sequence is determined by:

$ABW*IB*TemporalData+IB*(Ordinal-(Ordinal/ABW)*ABW)$, wherein:
ABW=the predetermined attribute-bucket size, and also being a number of event indicators in the each hash record;
IB=a size of the predetermined attribute-bucket size of event indicators of the each hash record;
TemporalData=a set of timespan values representing the temporal data of a hash record, of the one or more hash records, comprising the each event indicator; and
Ordinal=an ordinal number assigned to the field name associated with the target attribute bucket.

9. The method of claim 8, wherein:
the each time granularity level of the one or more time granularity levels further comprises a level pivot value and a level granularity value;
the level pointer to the single time bucket associated with the each time granularity level of the one or more time granularity levels and the each hash record of the one or more hash records is determined by:

$(TS-PV)/GV$, wherein:
TS=a timestamp of the single time bucket associated with the each time granularity level of the one or more time granularity levels and the each hash record of the one or more hash records;
PV=the level pivot value of the each time granularity level of the one or more time granularity levels; and
GV=the level granularity value of the each time granularity level of the one or more time granularity levels;
IB is one; and
the time bucket hierarchy corresponds to a hierarchical file system structure where each of the one or more leaf time buckets is associated with a file, while each of the one or more time buckets other than the one or more leaf time buckets is associated with a directory.

10. The method of claim 1 further comprising:
determining a partition associated with a primary key value of the event, the partition comprising the hash table; and
choosing a system among one or more systems to execute the retrieving the at least one result event indicator and the retrieving the search result, based on the partition so that when another partition is associated with another primary key value and comprises another hash table, the method is performed by parallel computing.

11. A system comprising:
one or more processors; and
one or more non-transitory computer-readable media storing computing instructions configured to run on the one or more processors and perform:
receiving an inquiry from a user, the inquiry comprising an event having a time period and a changed attribute;
retrieving at least one result event indicator, based on the time period and the changed attribute, from a hash table stored in a computer database, wherein:
the hash table comprises a hash function, the hash function being configured to locate the at least one result event indicator in the hash table based on the time period and a name of the changed attribute;
the at least one result event indicator comprises information about one or more matched event records in one or more event databases;
the one or more event databases store one or more event records including the one or more matched event records; and
each of the one or more event records comprises an updated column name and a timestamp; and
retrieving a search result based on the inquiry and the one or more matched event records associated with the at least one result event indicator.

12. The system of claim 11, wherein:
the hash table comprises one or more attribute buckets, each of the one or more attribute buckets comprising a predetermined attribute-bucket size and a time bucket hierarchy; the hash table is updated when a new event record is added to the one or more event records, by:
determining an attribute bucket, of the one or more attribute buckets and associated with the updated column name of the new event record, by looking up, in a computer cache, an ordinal number assigned to the updated column name of the new event record;
when the ordinal number assigned to the updated column name of the new event record does not exist:
assigning a new ordinal number to the updated column name of the new event record based on a maximum ordinal number saved in the computer cache and increasing the maximum ordinal number in the computer cache by one;
when a last attribute bucket of the one or more attribute buckets is associated with the new ordinal number, determining an event indicator in the last attribute bucket based on the hash function of the updated column name and the timestamp of the new event record; and
when none of the one or more attribute buckets is associated with the new ordinal number, creating a new attribute bucket in the one or more attribute buckets,
wherein:
the new attribute bucket is associated with a number of consecutive, ascending attribute ordinal numbers starting from the new ordinal number, the number being the predetermined attribute-bucket size of the new attribute bucket; and
the time bucket hierarchy of the new attribute bucket comprises one or more new time buckets, one of the one or more new time buckets comprising the event indicator determined based on the hash function of the updated column name and the timestamp of the new event record; and
updating the event indicator based on the new event record according to an event indicator update rule.

13. The system of claim 12, wherein:
the event indicator update rule, for updating an associated event indicator based on an associated event record, comprises one of:
if a value of the associated event indicator is zero, setting the associated event indicator to one;
increasing the associated event indicator by one; or
saving to the associated event indicator a pointer to the associated event record in the one or more event databases.

14. The system of claim 12, wherein:
the time bucket hierarchy of each attribute bucket of the one or more attribute buckets in the hash table further comprises one or more time granularity levels and one or more time buckets, each of the one or more time buckets comprising a timespan and being associated with a single time granularity level of the one or more time granularity levels, and the one or more time buckets comprising the one or more new time buckets;
the each attribute bucket of the one or more attribute buckets comprises one or more hash records, each hash record of the one or more hash records including a predetermined number of event identifiers, the predetermined number being the predetermined attribute-bucket size of the each attribute bucket; and
one or more leaf time buckets of the one or more time buckets each further comprise a single bucket hash record of the one or more hash records, while the each hash record of the each attribute bucket is part of only a single leaf time bucket of the one or more leaf time buckets.

15. The system of claim 11, wherein:
the hash function is configured to locate a target event indicator in the hash table based on a field name and a time range, by:
  determining a target attribute bucket of the target event indicator based on the field name, the target attribute bucket comprising a time bucket hierarchy and one or more hash records, each hash record of the one or more hash records including a predetermined attribute-bucket size of event indicators;
  when the target attribute bucket associated with the field name exists in the hash table, determining at least one target leaf time bucket in the time bucket hierarchy based on the time range, wherein:
    the time bucket hierarchy comprises one or more time buckets and one or more time granularity levels;
    each time bucket of the one or more time buckets comprises a timespan and is associated with a single time granularity level of the one or more time granularity levels;
    one or more leaf time buckets of the one or more time buckets are at a finest time granularity level of the one or more time granularity levels, and each of the one or more leaf time buckets comprises a single hash record selected from the one or more hash records in the target attribute bucket, and the one or more leaf time buckets comprise the at least one target leaf time bucket, wherein the one or more leaf time buckets comprise the at least one target leaf time bucket; and
    the timespan of the at least one target leaf time bucket overlaps with the time range; and
  retrieving the target event indicator of the single hash record of the at least one target leaf time bucket based on the field name.

16. The system of claim 15, wherein:
the hash function is further configured to determine whether the target attribute bucket associated with the field name exists in the hash table by determining whether an ordinal number assigned to the field name associated with the target attribute bucket exists in a computer cache.

17. The system of claim 15, wherein:
the each time bucket of the one or more time buckets further comprises an active record indicator configured to indicate whether at least one active hash record of the one or more hash records in the target attribute bucket exists in at least one leaf time bucket associated with the each time bucket; and
the at least one active hash record comprises at least one event indicator that is associated with at least one event record of the one or more event records.

18. The system of claim 15, wherein:
along each time granularity level of the one or more time granularity levels of the time bucket hierarchy, a single time bucket, of the one or more time buckets and associated with the each time granularity level, is associated with the each hash record of the one or more hash records;
the each hash record of the one or more hash records further comprises temporal data, the temporal data comprising a level pointer to the single time bucket associated with the each time granularity level of the one or more time granularity levels and the each hash record;
each event indicator of the predetermined attribute-bucket size of event indicators of the each hash record of the one or more hash records is configured to indicate whether at least one of the one or more event records falls within a leaf time bucket of the one or more leaf time buckets, the leaf time bucket comprising the each hash record comprising the each event indicator;
the one or more hash records of the target attribute bucket are stored in an ascending sequence based on the temporal data of the each hash record of the one or more hash records; and
a relative location of the each event indicator among the one or more hash records stored in the ascending sequence is determined by:

$$ABW*IB*\text{TemporalData}+IB*(\text{Ordinal}-(\text{Ordinal}/ABW)*ABW),$$

wherein:
  ABW=the predetermined attribute-bucket size, and also being a number of event indicators in the each hash record;
  IB=a size of the predetermined attribute-bucket size of event indicators of the each hash record;
  TemporalData=a set of timespan values representing the temporal data of a hash record, of the one or more hash records, comprising the each event indicator; and
  Ordinal=an ordinal number assigned to the field name associated with the target attribute bucket.

19. The system of claim 18, wherein:
the each time granularity level of the one or more time granularity levels further comprises a level pivot value and a level granularity value;
the level pointer to the single time bucket associated with the each time granularity level of the one or more time granularity levels and the each hash record of the one or more hash records is determined by:

$$(TS-PV)/GV,$$

wherein:
  TS=a timestamp of the single time bucket associated with the each time granularity level of the one or more time granularity levels and the each hash record of the one or more hash records;
  PV=the level pivot value of the each time granularity level of the one or more time granularity levels; and GV=the level granularity value of the each time granularity level of the one or more time granularity levels;

IB is one; and the time bucket hierarchy corresponds to a hierarchical file system structure where each of the one or more leaf time buckets is associated with a file, while each of the one or more time buckets other than the one or more leaf time buckets is associated with a directory.

20. The system of claim 11, wherein:

the computing instructions are further configured to run on the one or more processors and perform:

determining a partition associated with a primary key value of the event, the partition comprising the hash table; and choosing a sub-system among one or more sub-systems to execute the retrieving the at least one result event indicator and the retrieving the search result, based on the partition so that when another partition is associated with another primary key value and comprises another hash table, the system is performed by parallel computing.

\* \* \* \* \*